United States Patent [19]
Lee

[11] Patent Number: 5,529,733
[45] Date of Patent: Jun. 25, 1996

[54] METHOD FOR MAKING TUBULAR MEMBERS COATED WITH A DECORATIVE LAYER HAVING A RANDOMLY DISTRIBUTED CHIP PATTERN

[75] Inventor: Yeou-Ching Lee, Taipei, Taiwan

[73] Assignee: Alvin Lee Jewelry, Inc., Taipei, Taiwan

[21] Appl. No.: 319,287

[22] Filed: Oct. 6, 1994

[51] Int. Cl.⁶ .................................................. B29C 39/12
[52] U.S. Cl. ........................... 264/73; 264/159; 264/162; 264/220; 264/225; 264/227; 264/245; 401/221; 425/175
[58] Field of Search ..................... 264/73, 225, 245–247, 264/220, 159, 227, 157, 162; 425/175, 179; 401/221

[56] References Cited

U.S. PATENT DOCUMENTS

| | | | |
|---|---|---|---|
| 573,564 | 12/1896 | Ziegler-Reinacher | 264/245 |
| 1,902,573 | 3/1933 | Neidich | 264/162 |
| 1,915,936 | 6/1933 | Loomis | 264/157 |
| 1,951,853 | 3/1934 | Walsh | 264/246 |
| 1,972,166 | 9/1934 | Schneider et al. | 264/245 |
| 2,019,590 | 11/1935 | Westra | 264/220 |
| 2,044,356 | 6/1936 | Keeran | 264/245 |
| 3,285,835 | 11/1966 | Farrow | 264/227 |
| 3,773,602 | 11/1973 | Killmer | 264/220 |
| 4,188,316 | 2/1980 | Sawada | 264/245 |
| 4,551,297 | 11/1985 | Bötcher et al. | 264/227 |

FOREIGN PATENT DOCUMENTS

| | | | |
|---|---|---|---|
| 50-01892 | 1/1975 | Japan | 264/73 |

OTHER PUBLICATIONS

"From Raw Material to Fountain Pen", Plastics Engineering, *Modern Plastics*, Jun. 1946, pp. 137–141.

*Primary Examiner*—Jeffery R. Thurlow
*Attorney, Agent, or Firm*—Clifford W. Browning; Woodard, Emhardt, Naughton, Moriarity & McNett

[57] ABSTRACT

A method for making tubular members, each of which is coated with a decorative layer that has a randomly distributed chip pattern, includes the steps of: (A) preparing tube products, each of which having two ends and an intermediate portion between the two ends; (B) preparing a mold having a plurality of mold cavities; (C) sleeving detachably a pair of positioning members around the two ends of each of the tube products for enclosing and centering the two ends, and placing each of the tube products and the positioning members associated therewith in a respective one of the mold cavities; (D) forming a covering around the intermediate portion of each of the tube products by filling each of the mold cavities with a coating composition containing chips; (E) removing each of the covered tube products and the positioning members associated therewith from the mold, and detaching the positioning members from each of the covered tube products; and (F) machining and polishing the covered tube products, and cutting off the two ends of each of the covered tube products.

5 Claims, 4 Drawing Sheets

METHOD FOR MAKING TUBULAR MEMBERS COATED WITH A DECORATIVE LAYER HAVING A RANDOMLY DISTRIBUTED CHIP PATTERN

BACKGROUND OF THE INVENTION

1. Field of the Invention

This invention relates to a method for making tubes, more particularly to a method for making tubular members, each of which is coated with a decorative layer that has a randomly distributed chip pattern.

2. Description of the Related Art

A pen barrel generally has a tube body and a decorative covering provided around the outer surface of the tube body. FIG. 1 shows a method for making a pen barrel having a celluloid decorative covering. Generally, a celluloid block 10 is prepared and cut into pieces 11 with a predetermined size. The celluloid piece 11 is machined into a tube member 12, and a metallic tube body 13 is then inserted into the tube member 12. After polishing the tube member 12, a pen barrel having a celluloid covering is formed. Owing to a randomly distributed chip pattern on the celluloid covering, the celluloid covering provides a decorative effect. Since the celluloid piece 11 is small and since the celluloid material is brittle, it is difficult and inconvenient to form the through hole in the tube member 12. Therefore, during the manufacturing of tube members 12, large numbers of defective products are usually formed.

SUMMARY OF THE INVENTION

The objective of this invention is to provide a method for making tubular members, each of which is coated with a decorative layer that has a randomly distributed chip pattern. By the use of the method of this invention, a pen barrel having an appearance similar to that of the conventional celluloid covered pen barrel can be easily and conveniently manufactured.

The method according to this invention is used for making tubular members, each of which is coated with a decorative layer that has a randomly distributed chip pattern, and includes the steps of: (A) preparing tube products, each of which having two ends and an intermediate portion between the two ends; (B) preparing a mold having a plurality of mold cavities; (C) sleeving detachably a pair of positioning members around the two ends of each of the tube products for enclosing and centering the two ends, and placing each of the tube products and the positioning members associated therewith in a respective one of the mold cavities; (D) forming a covering around the intermediate portion of each of the tube products by filling each of the mold cavities with a coating composition containing chips; (E) removing each of the covered tube products and the positioning members associated therewith from the mold, and detaching the positioning members from each of the covered tube products; and (F) machining and polishing the covered tube products, and cutting off the two ends of each of the covered tube products.

The chips of the coating composition can be made from at least one material selected from the group consisting of plastics, stones, shells, metal and wood. The coating composition further contains a polyester resin and a hardener of methyl ethyl ketone peroxide.

The step (B) includes steps of: (B1) preparing a first positive model that has a model tube identical in shape and size to each of the tube products and an enclosing body in which the model tube is centered; (B2) forming a negative mold by using the first positive model; (B3) forming a plurality of second positive models, each of which being identical in shape and size to the enclosing body, with the use of the negative mold; (B4) preparing a mold box having a receiving space, and arranging spacedly the second positive models in the receiving space of the mold box; (B5) filling the receiving space of the mold box with a molding composition; and (B5) removing the second positive models from the mold box.

In addition, the enclosing body may include two end parts and an intermediate hollow part between the two end parts. Each of the two end parts is identical in shape and size to a respective one of the positioning members and has a blind hole for enclosing and centering a respective one of the two ends of the model tube of the first positive model. The intermediate hollow part is provided around the intermediate portion of the model tube.

BRIEF DESCRIPTION OF THE DRAWINGS

Other features and advantages of the present invention will become apparent in the following detailed description of the preferred embodiments, with reference to the accompanying drawings, in which.

DETAILED DESCRIPTION OF THE PREFERRED EMBODIMENT

The method of this invention, which is used for making tubular members coated with a decorative layer that has a randomly distributed chip pattern, includes the steps of: (A) preparing tube products, each of which having two ends and an intermediate portion between the two ends; (B) preparing a mold having a plurality of mold cavities; (C) sleeving detachably a pair of positioning members around the two ends of each of the tube products for enclosing and centering the two ends, and placing each of the tube products and the positioning members associated therewith in a respective one of the mold cavities; (D) forming a covering around the intermediate portion of each of the tube products by filling each of the mold cavities with a coating composition containing chips; (E) removing each of the covered tube products and the positioning members associated therewith from the mold, and detaching the positioning members from each of the covered tube products; and (F) machining and polishing the covered tube products, and cutting off the two ends of each of the covered tube products.

Figure 1:
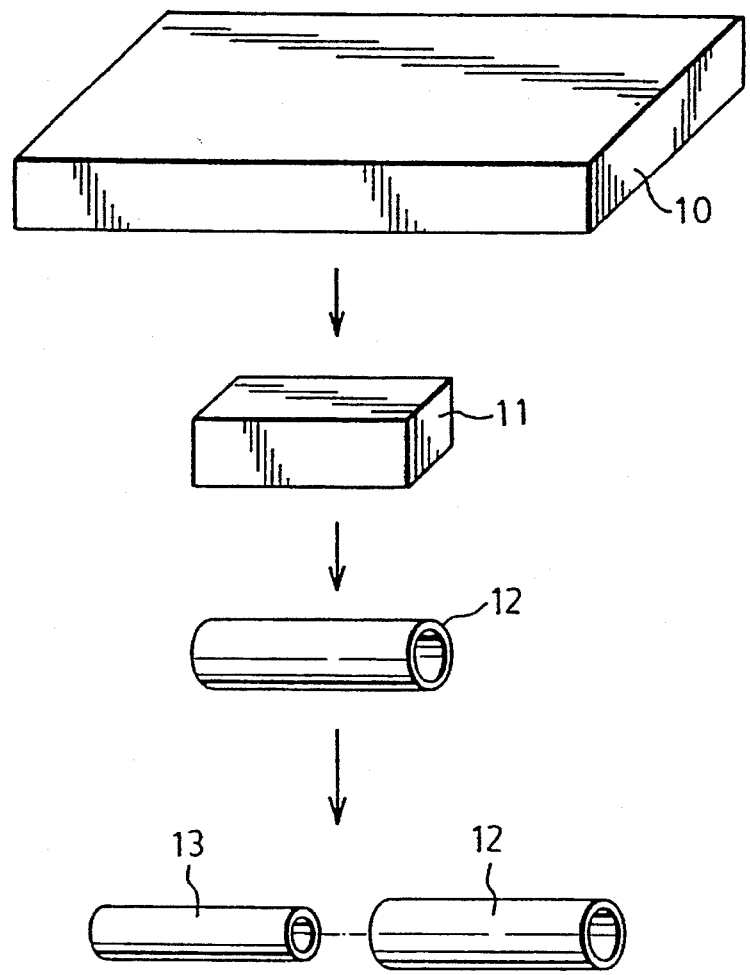
FIG. 1 is a schematic view showing the manufacturing of a conventional pen barrel.
Figure 2:
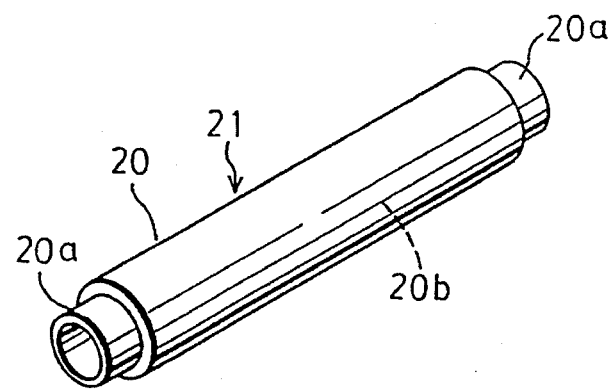
FIG. 2 is a perspective view of a tube product coated with a decorative layer having a randomly distributed chip pattern.
Figure 3:
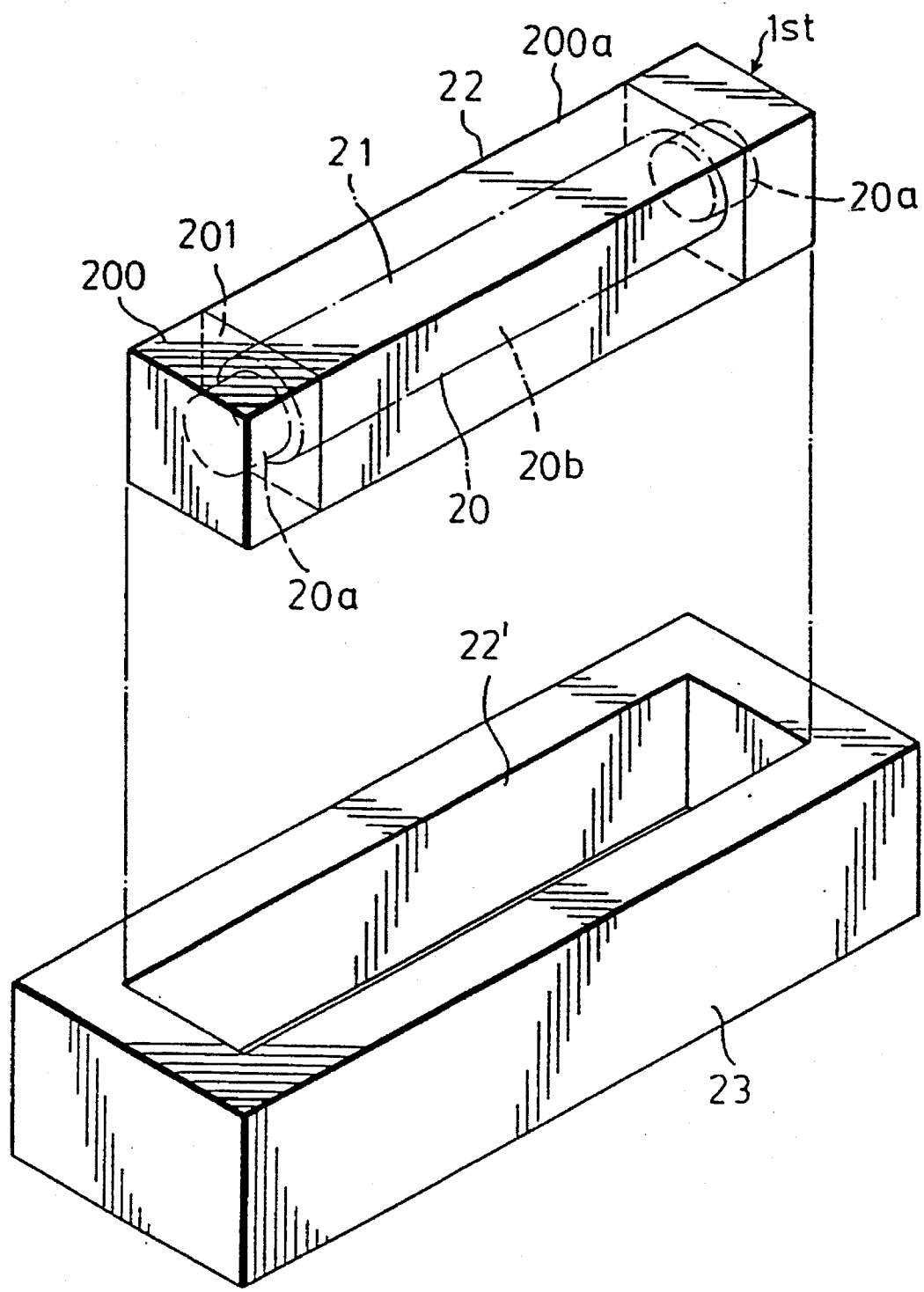
FIG. 3 is a schematic view of a first positive model and a negative mold of this invention.
Figure 7:
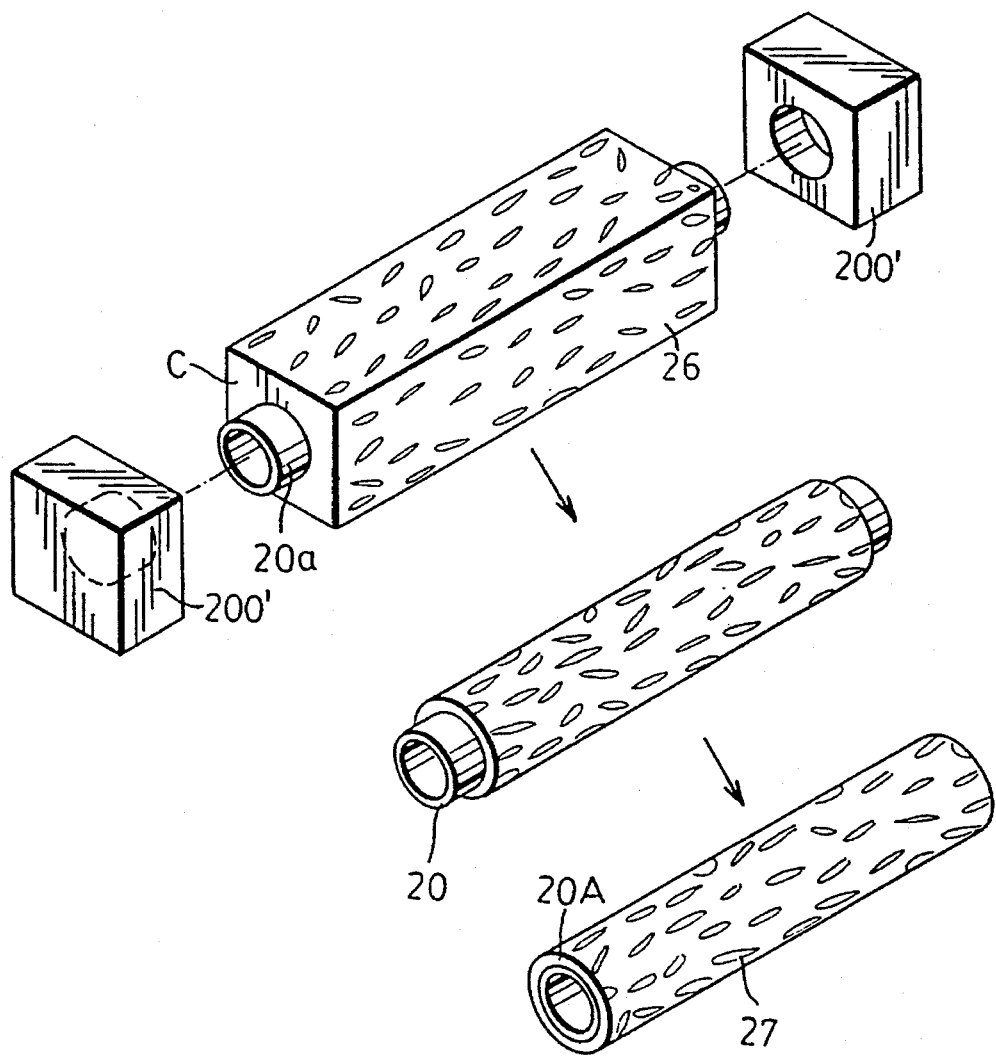
FIG. 7 is a schematic view showing the formation of a tubular member coated with a decorative layer.

Referring to FIG. 7, a tubular member (20A) coated with a decorative layer 27 having a randomly distributed chip pattern is formed according to the method of this invention. Referring to FIG. 2, in order to form the tubular member (20A) coated with the decorative layer 27, a tube product 20 is primarily prepared and is used as a model tube. The tube product 20 can be made from metal, wood, rock or plastics, and has two ends (20a) and an intermediate portion (20b). The intermediate portion (20b) is coated with a covering layer 21 having a thickness identical to that of the decorative layer 27. Referring to FIG. 3, the tube product 20 coated with the covering layer 21 is centered and is enclosed in an enclosing body (200a). The enclosing body (200a) includes two end parts 200 having two opposite blind bores for enclosing and centering two ends (20a) of the tube product 20, and an intermediate hollow part 201 provided around the intermediate portion (20b) of the tube product 20. In this way, a first positive model (1st) is formed. Afterwards, by means of the first positive model (1st), a negative mold 23 having a mold cavity 22' identical in size and shape to the enclosing body (200a) is formed. The negative mold 23 may be made from a material of silicone rubber.

Figure 4:
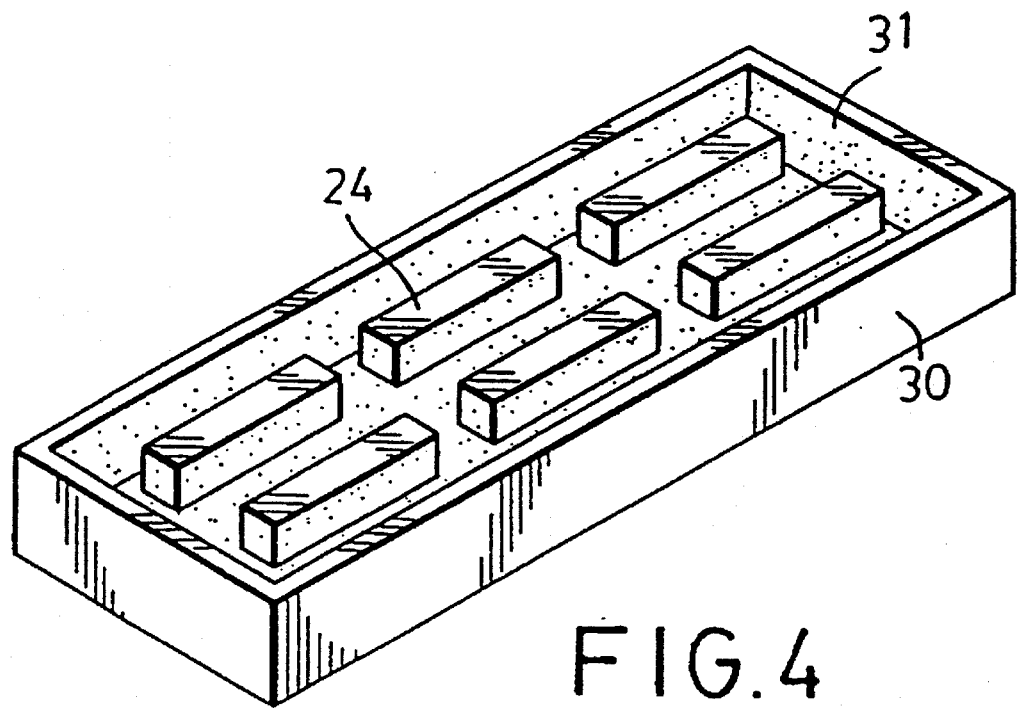
FIG. 4 is a schematic view of a mold box having second positive models arranged spacedly therein.
Figure 5:
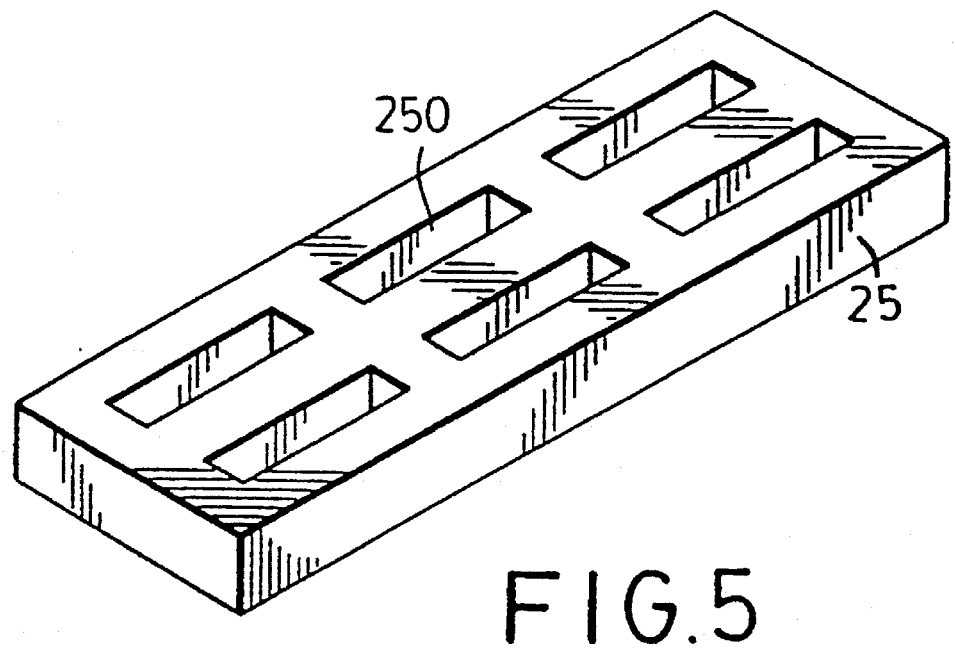
FIG. 5 is a schematic view of a mold having a plurality of mold cavities.

Referring to FIG. 4, a plurality of second positive models 24 identical in shape and size to the enclosing body (200a) of the first positive model (1st) are formed by the use of the negative mold 23. The second positive model 24 may be formed by filling the mold cavity 22' with a composition containing polyester resin and hardener so as to form the positive model 24 after the composition cures and by removing the formed positive model 24 from the mold cavity 22'. By repeating the above process, a plurality of positive models 24 can be formed.

Referring to FIG. 4, a mold box 30, which has a predetermined size and an inner wall that confines a receiving space, is prepared. The inner wall of the mold box 30 is primarily coated with silicone rubber. The second positive models 24 are then arranged spacedly in the receiving space of the mold box 30 such that the top portion of each of the second positive models 24 is flush with the top periphery of the mold box 30. The receiving space of the mold box 30 is filled with silicone rubber. After the silicone rubber cures, the second positive models 24 are removed from the mold box 30. Thus, a mold 25 with a plurality of mold cavities 250 is formed.

Figure 6:
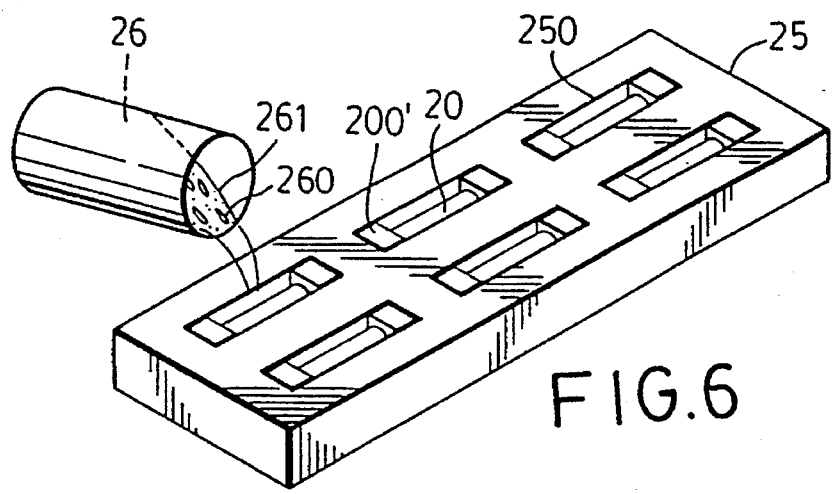
FIG. 6 is a schematic view showing the formation of a covering around each tube product with the use of the mold shown in FIG. 5.

Referring to FIG. 6, a coating composition 26 containing chips 260, a liquid resin and a hardener 261 is prepared. The chips 260 can be made from at least one material selected from the group consisting of plastics, stones, shells, metal and wood, and can have a single color or different colors. Examples of such chips are acrylic chips, mother of pearl (shell) chips, abalone (shell) chips and other seashell chips. The resin may be translucent or opaque and may have any color. In this embodiment, the resin is a polyester resin, and the hardener is methyl ethyl ketone peroxide (MEKPO). The chips 260, the resin and the hardener 261 are mixed and stirred homogeneously so as to form the coating composition 26.

Referring to FIG. 6, a plurality of tube products 20 are prepared. A pair of positioning members 200' for each of the tube products 20 are prepared. Each of the positioning members 200' has a structure identical to that of the end part 200 of the enclosing body (200a) of the first positive model (1lst). Two opposite blind bores of the positioning members 200' are sleeved respectively around two ends (20a) of each of the tube products 20 for enclosing and centering the ends (20a) of the tube product 20. Each of the tube products 20 and the positioning members 200' associated therewith are placed in a respective one of the mold cavities 250 of the mold 25. Then, each of the mold cavities 250 is filled with the coating composition 26 so as to form a covering (c) around the intermediate portion (20b) of each of the tube products 20 after the coating composition 26 cures. Referring to FIG. 7, each of the covered tube products 20 and the positioning members 200' associated therewith are removed from the mold 25. The positioning members 200' are detached from the covered tube product 20. Thereafter, the covered tube product 20 is machined to have a tubular shape with a predetermined size. The two ends (20a) of the tube product 20 are cut-off, and the covered tube product 20 is then polished to have a decorative layer 27 with a predetermined thickness. Since the coating composition 26 contains chips and a resin, the decorative layer 27 has a randomly distributed chip pattern and an appearance similar to that of the conventional celluloid-covered pen barrel.

The tubular member (20A) coated with the decorative layer 27 can be used as a pen barrel which has an appearance similar to that of the conventional celluloid covered pen barrel. It can be known that, by the use of the method of this invention, a machining step for forming a through hole in the celluloid piece 11 is eliminated, thereby minimizing the formation of defective products and making the manufacture of a pen barrel with a randomly distributed chip pattern easy and convenient to achieve. Thus, the cost of such a pen barrel can be lowered compared to the conventional one.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A method for making a pen barrel that, has a decorative sleeve layer presenting a randomly distributed chip pattern, the method comprising the steps of:

(A) preforming a tube having two ends and an intermediate portion between said two ends;

(B) providing at least one mold cavity in a mold, said at least one mold cavity being used for forming said pen barrel;

(C) sleeving detachably a pair of positioning members respectively around said two ends of said tube and positioning said pair of said positioning members in said mold cavity so as to center said tube in said mold cavity and so as to create, in said mold cavity, a molding space surrounding the entire peripheral surface of said intermediate portion;

(D) filling said molding space with a coating composition to form a covering integral with the entire peripheral surface of said intermediate portion, said coating composition containing a polyester resin, a hardener and chips;

(E) removing from said mold cavity said tube together with said covering and said positioning members, and detaching said positioning members from said tube; and (F) machining and polishing said covering and cutting off said two ends of said tube to form said pen barrel.

2. A method as claimed in claim 1, wherein the step (B) comprises the steps of: (B1) preparing a first positive model that has a model tube identical in shape and size to each of said tube products and an enclosing body in which said model tube is centered; (B2) forming a negative mold by using said first positive model; (B3) forming a plurality of second positive models, each of which being identical in shape and size to said enclosing body, by using said negative mold; (B4) preparing a mold box having a receiving space, and arranging spacedly said second positive models in said receiving space of said mold box; (B5) filling said receiving space of said mold box with a molding composition; and (B5) removing said second positive models from said mold box; whereby a plurality of said mold cavities is formed in said mold box.

3. A method as claimed in claim 2, wherein said enclosing body includes two end parts and an intermediate hollow part between said two end parts, each of said two end parts being identical in shape and size to a respective one of said positioning members and having a blind hole for enclosing and centering a respective one of said two ends of said model tube of said first positive model, said intermediate hollow part being provided around said intermediate portion of said model tube.

4. A method as claimed in claim 1, wherein said chips of said coating composition are made from at least one material selected from the group consisting of plastics, stones, shells, metal and wood.

5. A method according to claim 1, wherein in step (B) a plurality of mold cavities are provided.

* * * * *

UNITED STATES PATENT AND TRADEMARK OFFICE
CERTIFICATE OF CORRECTION

PATENT NO. : 5,529,733

DATED : June 25, 1996

INVENTOR(S) : Yeou-Ching Lee

It is certified that error appears in the above-identified patent and that said Letters Patent is hereby corrected as shown below:

In column 3, line 63, "(11st)" should be --(1st)--.

Signed and Sealed this

Seventeenth Day of December, 1996

BRUCE LEHMAN

Attesting Officer    Commissioner of Patents and Trademarks